(12) United States Patent
Corcoran

(10) Patent No.: US 9,070,032 B2
(45) Date of Patent: Jun. 30, 2015

(54) METHOD OF PROGRAMMING A SYMBOL READING SYSTEM

(71) Applicant: Hand Held Products, Inc., Fort Mill, SC (US)

(72) Inventor: Susan Corcoran, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/859,846

(22) Filed: Apr. 10, 2013

(65) Prior Publication Data

US 2014/0306012 A1 Oct. 16, 2014

(51) Int. Cl.
*G06F 17/00* (2006.01)
*G06F 19/00* (2011.01)
*G06K 7/00* (2006.01)
*G06K 7/10* (2006.01)

(52) U.S. Cl.
CPC .................................. *G06K 7/10821* (2013.01)

(58) Field of Classification Search
CPC ................ G06K 2207/1017; G06K 19/06018; G06K 19/06028; G06K 7/1095; H04N 1/00968
USPC ........... 235/375, 462.15, 454, 462.01–462.49
See application file for complete search history.

(56) References Cited

U.S. PATENT DOCUMENTS

| | | | |
|---|---|---|---|
| 4,825,058 A * | 4/1989 | Poland | 235/462.01 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Michael G Lee
*Assistant Examiner* — Laura Gudorf
(74) *Attorney, Agent, or Firm* — Additon, Higgins & Pendleton, P.A.

(57) ABSTRACT

A method of programming a symbol reading system having a field of view includes selecting a programming command from a list of programming commands for programming a symbol reading system. The list of programming commands is typically stored on a computer that includes a processor configured for, in response to the selection of a programming command from the list of programming commands, generating a page bearing a symbol corresponding to the selected programming command and no other symbol corresponding to another programming command in the list of programming commands. The method also includes placing the computer generated page bearing a symbol corresponding to the selected programming command within the system's field of view.

13 Claims, 5 Drawing Sheets

(56) References Cited

U.S. PATENT DOCUMENTS

| | | | |
|---|---|---|---|
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2001/0007334 A1 | 7/2001 | Wilz, Sr. et al. |
| 2007/0063048 A1 | 3/2007 | Havens et al. |
| 2007/0119941 A1 | 5/2007 | He |
| 2007/0252007 A1* | 11/2007 | Watanabe ............. 235/462.15 |
| 2008/0185432 A1 | 8/2008 | Caballero et al. |
| 2008/0237331 A1* | 10/2008 | Hammer ................. 235/375 |
| 2009/0134221 A1 | 5/2009 | Zhu et al. |
| 2009/0323133 A1* | 12/2009 | Koch et al. ............... 358/474 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0281417 A1* | 11/2010 | Yolleck et al. ............ 715/779 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2014/0100813 A1 | 1/2013 | Showering |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |

(56) References Cited

U.S. PATENT DOCUMENTS

| | | | |
|---|---|---|---|
| 2014/0042814 | A1 | 2/2014 | Kather et al. |
| 2014/0049120 | A1 | 2/2014 | Kohtz et al. |
| 2014/0049635 | A1 | 2/2014 | Laffargue et al. |
| 2014/0061305 | A1 | 3/2014 | Nahill et al. |
| 2014/0061306 | A1 | 3/2014 | Wu et al. |
| 2014/0061307 | A1 | 3/2014 | Wang et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0075846 | A1 | 3/2014 | Woodburn |
| 2014/0076974 | A1 | 3/2014 | Havens et al. |
| 2014/0078341 | A1 | 3/2014 | Havens et al. |
| 2014/0078342 | A1 | 3/2014 | Li et al. |
| 2014/0078345 | A1 | 3/2014 | Showering |
| 2014/0084068 | A1 | 3/2014 | Gillet et al. |
| 2014/0086348 | A1 | 3/2014 | Peake et al. |
| 2014/0097249 | A1 | 4/2014 | Gomez et al. |
| 2014/0098284 | A1 | 4/2014 | Oberpriller et al. |
| 2014/0098792 | A1 | 4/2014 | Wang et al. |
| 2014/0100774 | A1 | 4/2014 | Showering |
| 2014/0103115 | A1 | 4/2014 | Meier et al. |
| 2014/0104413 | A1 | 4/2014 | McCloskey et al. |
| 2014/0104414 | A1 | 4/2014 | McCloskey et al. |
| 2014/0104416 | A1 | 4/2014 | Li et al. |
| 2014/0104451 | A1 | 4/2014 | Todeschini et al. |
| 2014/0106594 | A1 | 4/2014 | Skvoretz |
| 2014/0106725 | A1 | 4/2014 | Sauerwein |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0114530 | A1 | 4/2014 | Fitch et al. |
| 2014/0121438 | A1 | 5/2014 | Kearney |
| 2014/0121445 | A1 | 5/2014 | Ding et al. |
| 2014/0124577 | A1 | 5/2014 | Wang et al. |
| 2014/0124579 | A1 | 5/2014 | Ding |
| 2014/0125842 | A1 | 5/2014 | Winegar |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131441 | A1 | 5/2014 | Nahill et al. |
| 2014/0133379 | A1 | 5/2014 | Wang et al. |
| 2014/0140585 | A1 | 5/2014 | Wang |
| 2014/0151453 | A1 | 6/2014 | Meier et al. |
| 2014/0160329 | A1 | 6/2014 | Ren et al. |

OTHER PUBLICATIONS

U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control, filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination, filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion, filed Mar. 4, 2014 (Lui et al.); 25 pages.
U.S. Appl. No. 14/342,544 for Imaging Based Barcode Scanner Engine with Multiple Elements Supported on a Common Printed Circuit Board, filed Mar. 4, 2014 (Liu et al.); 27 pages.
U.S. Appl. No. 14/257,174 for Reading Apparatus Having Partial Frame Operating Mode, filed Apr. 21, 2014, (Barber et al.), 67 pages.
U.S. Appl. No. 14/200,405 for Indicia Reader for Size-Limited Applications, filed Mar. 7, 2014 (Feng et al.); 42 pages.
U.S. Appl. No. 14/166,103 for Indicia Reading Terminal Including Optical Filter, filed Jan. 28, 2014 (Lu et al.); 29 pages.
U.S. Appl. No. 14/274,858 for Mobile Printer With Optional Battery Accessory, filed May 12, 2014, (Marty et al.), 26 pages.

(56) References Cited

OTHER PUBLICATIONS

U.S. Appl. No. 14/264,173 for Autofocus Lens System for Indicia Readers, filed Apr. 29, 2014, (Ackley et al.), 39 pages.
U.S. Appl. No. 14/230,322 for Focus Module and Components with Actuator, filed Mar. 31, 2014 (Feng et al.); 92 pages.
U.S. Appl. No. 14/222,994 for Method and Apparatus for Reading Optical Indicia Using a Plurality of Data, filed Mar. 24, 2014 (Smith et al.); 30 pages.
U.S. Appl. No. 14/231,898 for Hand-Mounted Indicia-Reading Device with Finger Motion Triggering, filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
Great Britain Combined Search and Examination Report for related Application No. GB1409062.5; Dated Nov. 24, 2014; 5 pages. (Only references not previously disclosed in US application are noted above; US. 2008/0237331 was cited by US Examiner).

\* cited by examiner

METHOD OF PROGRAMMING A SYMBOL READING SYSTEM

FIELD OF THE INVENTION

The present invention relates to the field of symbol reading systems, more specifically, to a method of programming a symbol reading system.

BACKGROUND

Barcode symbol reading systems are typically provided to users with an initial programming configuration including default settings. The system user (e.g., the VAR, retail store owner or the cashier) typically reprograms or adjusts the settings of the system to suit a particular application, match the store's environment, and/or increase product throughput efficiency.

To program a typical bioptic, omni-directional scanning system, a user presents a barcode which the system scans and/or reads. Such systems are configured to, when presented with special programming barcodes, reprogram or adjust particular settings. For example, a programming barcode may correspond to increasing the volume of a beep emitted by the system when an item is successfully scanned.

The manufacturer of the system typically provides the programming barcodes that correspond to the different programming commands in a user manual. In this regard, a given page of the user manual typically includes multiple barcodes. Omni-directional scanning systems, by design, scan and/or read every barcode on a page or package that a user presents. Thus, traditional user manuals require the user to cover unwanted barcodes on the same page as a selected barcode before presenting the page to the system. Typically, users cover these other barcodes with blank pieces of paper or with their hands. This additional step of covering the unwanted barcodes complicates the process of programming the system and can be particularly cumbersome and awkward for users.

Therefore, a need exists for a system that provides programming symbols to users in a more efficient manner. There also exists a need for a method of programming a symbol reading system that does not require users to cover portions of a page bearing a symbol corresponding to a selected programming command.

SUMMARY

Accordingly, in one aspect, the present invention embraces method of programming a symbol reading system having a field of view that includes selecting a programming command from a list of programming commands for programming a symbol reading system. The list of programming commands is stored on a computer including a processor. The computer's processor is configured for, in response to the selection of a programming command from the list of programming commands, generating a page bearing a symbol corresponding to the selected programming command and no other symbol corresponding to another programming command in the list of programming commands. The method includes placing the computer generated page bearing a symbol corresponding to the selected programming command within the system's field of view.

In an exemplary embodiment, the method includes printing the computer generated page and thereafter placing the printed page bearing a symbol corresponding to the selected programming command within the system's field of view.

In another exemplary embodiment, the method includes selecting a second programming command from the list of programming commands, and placing a computer generated page bearing a symbol corresponding to the second selected programming command within the system's field of view.

In yet another exemplary embodiment, the method includes selecting a second programming command from the list of programming commands, selecting a third programming command from the list of programming commands, thereafter, placing a computer generated page bearing a symbol corresponding to the second selected programming command within the system's field of view, and thereafter, placing a computer generated page bearing a symbol corresponding to the third selected programming command within the system's field of view.

In yet another exemplary embodiment, the method includes selecting a second programming command from the list of programming commands, selecting a third programming command from the list of programming commands, thereafter, placing a computer generated page bearing a symbol corresponding to the third selected programming command within the system's field of view, and thereafter, placing a computer generated page bearing a symbol corresponding to the second selected programming command within the system's field of view.

In yet another exemplary embodiment, the method includes selecting a second programming command from the list of programming commands, selecting a third programming command from the list of programming commands, selecting a fourth programming command from the list of programming commands, thereafter, placing a computer generated page bearing a symbol corresponding to the second selected programming command within the system's field of view, thereafter, placing a computer generated page bearing a symbol corresponding to the third selected programming command within the system's field of view, and thereafter, placing a computer generated page bearing a symbol corresponding to the fourth selected programming command within the system's field of view.

In yet another exemplary embodiment, the method includes placing the computer generated page bearing a symbol corresponding to the selected programming command within the system's field of view multiple times.

In yet another exemplary embodiment, the list of programming commands includes the symbol corresponding to each of the programming commands.

In yet another exemplary embodiment, the computer is connected to a user interface and the step of selecting a programming command is performed via the user interface.

In yet another exemplary embodiment, the computer is connected to a visual display and the processor is configured to display the list of programming commands on the visual display.

In yet another exemplary embodiment, the pages bearing the symbols corresponding to the programming commands in the list of programming commands are stored on the computer.

In yet another exemplary embodiment, the pages bearing the symbols corresponding to the programming commands in the list of programming commands are stored on the computer and the list of programming commands and the pages bearing the symbols corresponding to the programming commands in the list of programming commands are stored separately on the computer.

In yet another exemplary embodiment, the symbol reading system includes a point of sale based system.

In yet another exemplary embodiment, the symbol reading system includes a digital imaging subsystem.

In yet another exemplary embodiment, the symbol reading system includes a laser scanning subsystem.

In yet another exemplary embodiment, the computer is a host computer communicatively connected to the symbol reading system.

In another aspect, the present invention embraces a method of programming a symbol reading system having a field of view that includes accessing a list of programming commands for programming the symbol reading system displayed on a visual display connected to a computer and selecting a programming command from the list of programming commands via a user interface connected to the computer. The computer includes a processor configured for, in response to the selection of a programming command from the list of commands, generating a page bearing a symbol corresponding to the selected programming command and no other symbol corresponding to another programming command in the list of programming commands. The method includes placing the computer generated page bearing a symbol corresponding to the selected programming command within the system's field of view.

In an exemplary embodiment, the list of programming commands is stored on the computer.

In another exemplary embodiment, the list of programming commands is stored on an external computer connected to the computer via a network connection.

In yet another exemplary embodiment, the pages bearing the symbols corresponding to the programming commands in the list of programming commands are stored on the computer, and the list of programming commands and the pages bearing the symbols corresponding to the programming commands in the list of programming commands are stored separately on the computer.

In yet another exemplary embodiment, the method includes printing the computer generated page and thereafter placing the printed page bearing a symbol corresponding to the selected programming command within the system's field of view.

In yet another exemplary embodiment, the method includes selecting a second programming command from the list of programming commands, and placing the computer generated page bearing a symbol corresponding to the second selected programming command within the system's field of view.

In yet another aspect, the present invention embraces a method of programming a barcode symbol reading system having a field of view that includes accessing a list that includes programming commands for programming the barcode symbol reading system and barcode symbols corresponding to each command. The list is displayed on a visual display connected to a computer. The method includes selecting a programming command from the list of programming commands via a user interface connected to the computer. The computer includes a processor configured for, in response to the selection of a programming command from the list of programming commands, generating a page bearing a barcode symbol corresponding to the selected programming command and no other barcode symbol corresponding to another programming command in the list of programming commands. The method includes printing the computer generated page bearing a barcode symbol corresponding to the selected programming command and placing the printed computer generated page within the system's field of view.

In an exemplary embodiment, the list of programming commands is stored on the computer.

In another exemplary embodiment, the list of programming commands is stored on an external computer connected to the computer via a network connection.

In yet another exemplary embodiment, the pages bearing the barcode symbols corresponding to the programming commands in the list of programming commands are stored on the computer, and the list of programming commands and the pages bearing the barcode symbols corresponding to the programming commands in the list of programming commands are stored separately on the computer.

In yet another exemplary embodiment, the method includes selecting a second programming command from the list of programming commands, and placing the computer generated page bearing a barcode symbol corresponding to the second selected programming command within the system's field of view.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
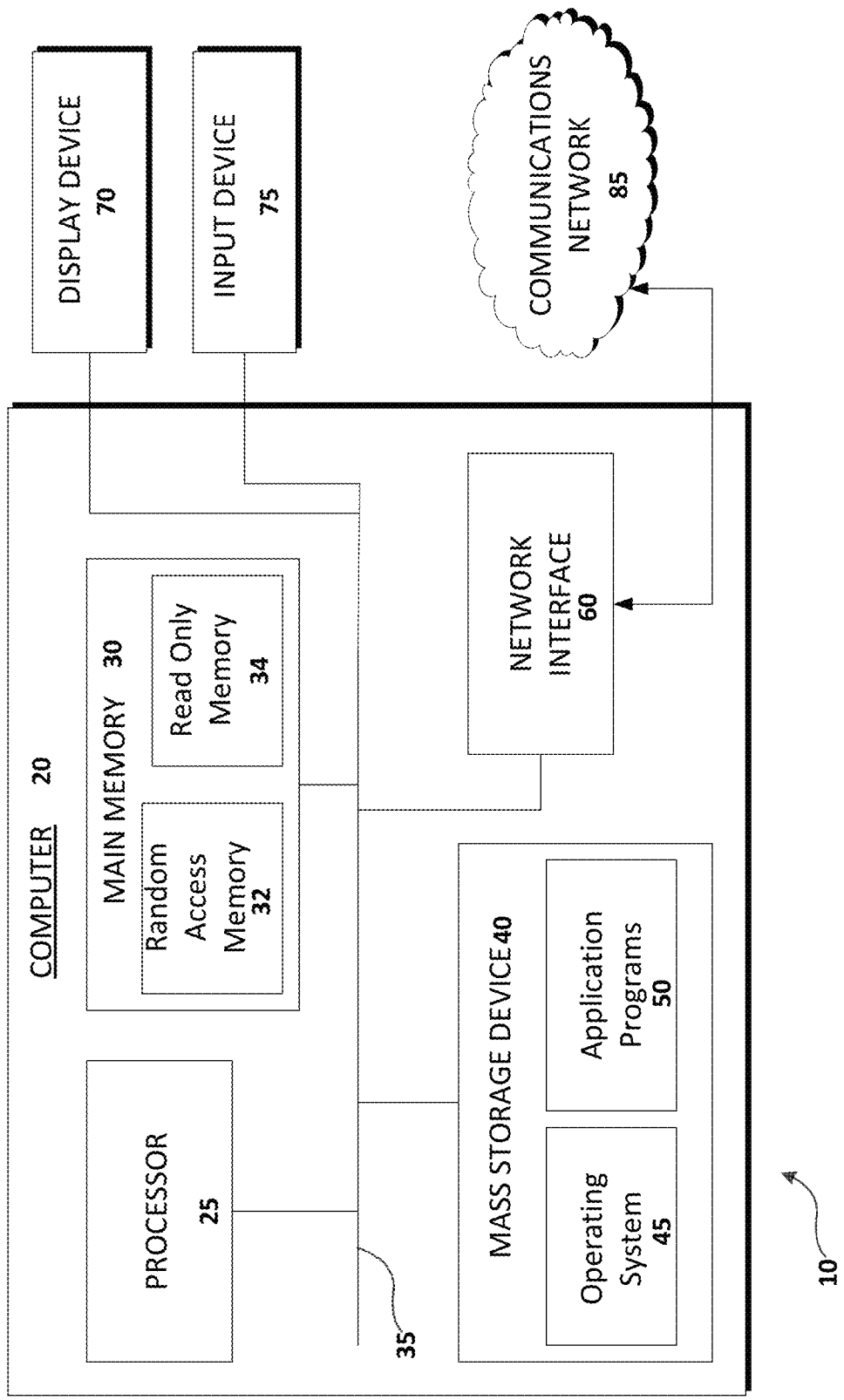
FIG. 1 is a schematic block diagram illustrating the components of an exemplary system according to the present invention.

In one aspect, the present invention embraces a system that provides programming symbols to users in a more efficient manner. In particular, the system includes a visual display, an input system, and a processor communicatively coupled to the visual display and the input system. The processor displays a list of commands for programming a symbol reading system on the visual display. In response to the selection of a programming command by a user via the input system, the processor displays a page bearing a symbol corresponding to the selected command and no other symbol corresponding to another command in the list of commands.

Typically, the list of programming commands and/or a list of the symbols corresponding to the programming commands is stored on memory (i.e., non-transitory computer-readable storage medium). In exemplary embodiments, the processor and the memory on which the list of programming commands and/or the list of the symbols is stored are part of the same computer (e.g., a host computer that may be communicatively connected to the symbol reading system). In other exemplary embodiments, the memory on which the list of programming commands and/or the list of the symbols is stored is communicatively connected to the processor via a network connection.

The term "symbol" is used in a broad sense to identify symbol indicia that are arranged in a specific way to represent elements of data in a machine readable form. The exemplary symbol of a one-dimensional (1D) barcode (i.e., a barcode symbol), which includes data encoded along a single axis in the widths of bars and spaces, is used to describe various aspects of the present invention. That said, the present invention may be employed in conjunction with other symbols, such as 1D stacked barcode symbols and two-dimensional matrix symbols.

The list of programming commands and the list of symbols are typically stored separately (i.e., in different locations or as distinct files) on the same memory. That said, the list of programming commands may be stored on different memory than the memory on which the list of symbols is stored. For example, the list of programming commands may be stored on a host computer's memory, and the list of symbols may be stored on memory communicatively connected to the processor via a network connection.

The list of programming commands and/or the list of symbols may be stored as one or more Portable Document Format (PDF) files. In this regard, the list of programming commands may be included in a user manual PDF file (e.g., a programming commands PDF file). In exemplary embodiments, the list of programming commands also includes an image of the symbol corresponding to each command adjacent the description of the command. The list of symbols may also be included in a PDF file (e.g., a symbols PDF file). The symbols PDF file includes a page for each symbol bearing only the symbol (i.e., a page bearing a single symbol corresponding to a command from the list of programming commands).

The programming commands PDF file and the symbols PDF file may be hyperlinked such that when a user selects a command (e.g., by clicking on the command or the symbol corresponding to the command in the programming commands PDF file), the page isolating the symbol corresponding to the selected command of the symbols PDF file is displayed. Thus, a user can select a command from the programming commands PDF file and then print the corresponding page from the symbols PDF file. Additionally, a user can view the symbols PDF file to locate other desired symbols for programming the symbol reading system. After identifying the page or pages of the desired symbol or symbols, the user can print the identified pages of the symbols PDF file and program the symbol reading system using the printed pages (e.g., by placing the printed pages in the symbol reading system's field of view).

In an exemplary embodiment, the input system includes a touch-screen and/or mouse. As a user selects a programming command in the list via the input system, the processor displays a modified view of the selected command (e.g., the text of the command and/or the symbol corresponding to the programming command). The modified view of the selected programming command may include a shift of the selected command with respect to its original position, a change in color and/or brightness, a change in size, and/or a shadow surrounding the outline of the selected command. The modified view of the selected programming command provides visual confirmation to a user that the command has been selected.

For example, if a user selects a programming command by using a mouse to place a pointer displayed on the visual display on the symbol corresponding to the command and clicks the mouse, the modified view may be the symbol shifted in position and outlined on two, three, or four sides to give the impression to a user that the symbol has been pushed into the page by the clicking of the mouse. In this regard, the modified view may be an animation including multiple images (e.g., two, three, four or more images) that appears to indicate motion of the selected command.

FIG. 1 is a schematic block diagram illustrating the components of an exemplary system 10 according to the present invention. A computer 20 includes a mass storage device 40 for storing an operating system 45 and application programs 50. The mass storage device 40 may store other types of information. The operating system 45 is software that controls the overall operation of the computer 20, including process scheduling and management, process protection, and memory management. Examples of a suitable operating system include, without limitation, WINDOWS® 7 and WINDOWS® EMBEDDED COMPACT (i.e., WINDOWS® CE) from MICROSOFT® CORPORATION of Redmond, Wash., the LINUX® open source operating system, and operating systems available from Apple, Inc. of Cupertino, Calif. (e.g., OS X). Typically, the operating system 45 is loaded by booting the computer 20 and is executed directly by the processor 25. An application program 50 is an executable software program designed to help the user perform specific tasks. The application programs 50 may load automatically upon execution of the operating system 45 or in response to a command input from the user. A main memory 30 provides for storage of instructions and data directly accessible by the processor 25. Main memory 30 may include random-access memory 32 (RAM) and read-only memory 34 (ROM). The ROM 34 may permanently store firmware or a basic input/output system (BIOS), which provide the first instructions to the computer 20 when it boots up. The RAM 32 typically serves as temporary and immediately accessible storage for the operating system 45 and application programs 50. The mass storage device 40 may be any of the various types of computer components capable of storing large amounts of data in a persisting (i.e., non-volatile) and machine-readable manner. Typically, the mass storage device 40 will be a hard disk drive. Alternatively, the mass storage device 40 may be a solid state drive, optical drive, removable flash drive or other component with similar storage capabilities.

A display device 70 (i.e., a visual display) is operably connected to the computer 20. The display device 70 displays information to the user in the form of text or graphical output generated by the computer 20. Typically, the display device 70 is a liquid crystal display (LCD) video monitor. An input device 75 (i.e., an input system) is operably connected to the computer 20. The input device 75 facilitates the input of instructions by the user. Typically, the input device 75 is a keyboard and/or a mouse.

An exemplary embodiment of the computer 20 of the system 10 according to the present invention also includes a network interface 60. The network interface 60 is logically connected to a communications network 65, thereby enabling the computer 20 to communicate with the communications network 65. The communications network 65 may be any collection of computers or communication devices interconnected by communication channels. The communication channels may be wired or wireless. Examples of such communication networks include, without limitation, local area networks, the Internet, and cellular networks. The connection to the communications network 65 allows the computer 20 to communicate with other network nodes (e.g., database servers and/or other computers).

Figure 2A:
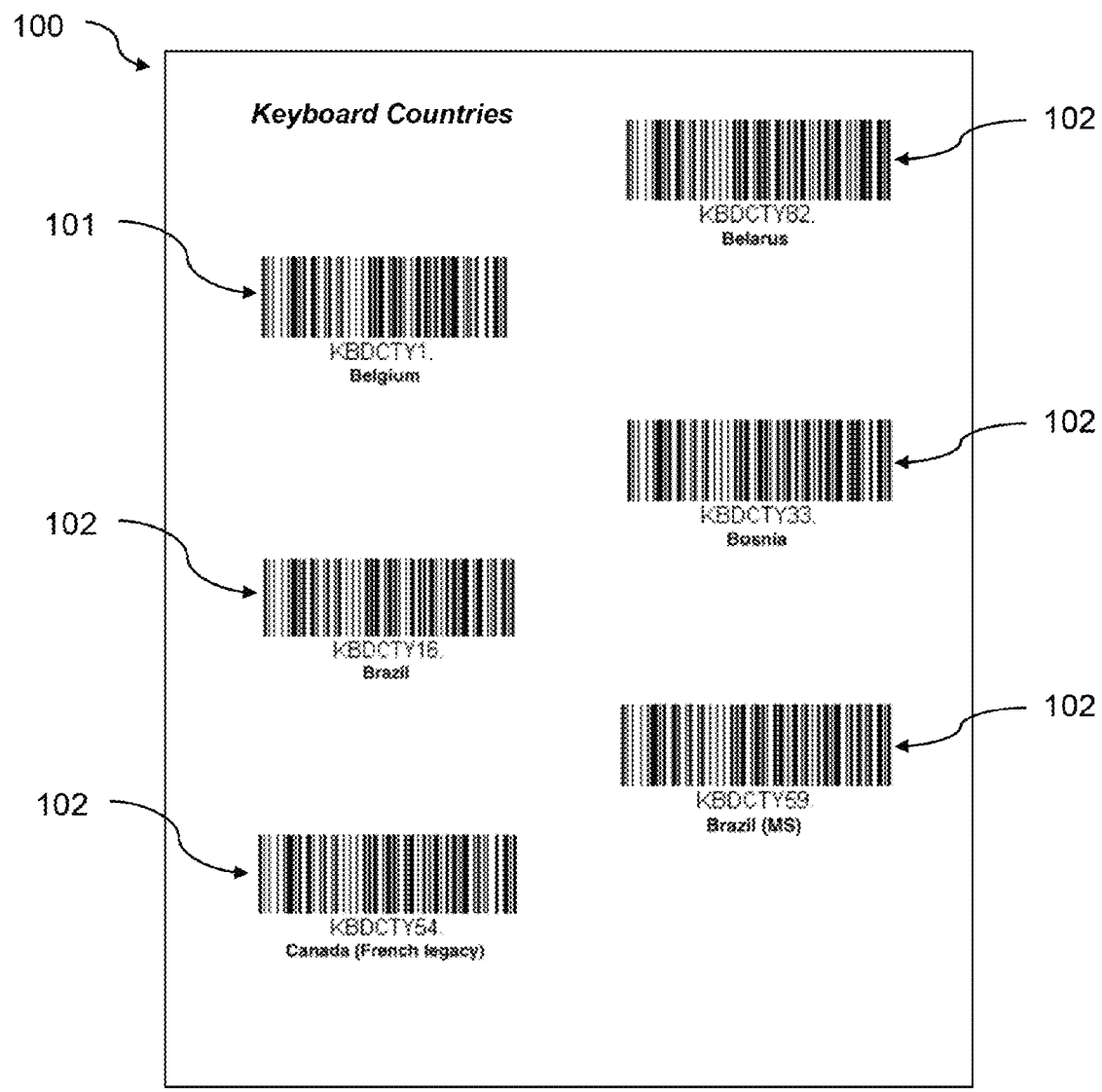
FIG. 2A depicts an exemplary list of programming commands and corresponding barcode symbols for programming a barcode symbol reading system in accordance with exemplary embodiments of the present invention.

As noted, the system's processor 25 is typically configured to display a list of programming commands for programming a symbol reading system on the display device 70. FIG. 2A depicts an exemplary list 100 of programming commands for programming a symbol reading system. The list 100 includes multiple programming commands and barcode symbols 101 and 102 corresponding to the programming commands. In response to the selection of a command (e.g., the selected command/barcode symbol 101 in FIGS. 2A-2C) by a user via the input device 75, the processor 25 displays a page 300 bearing a single barcode symbol 101 corresponding to the selected command (e.g., as in FIG. 2C).

Figure 2B:
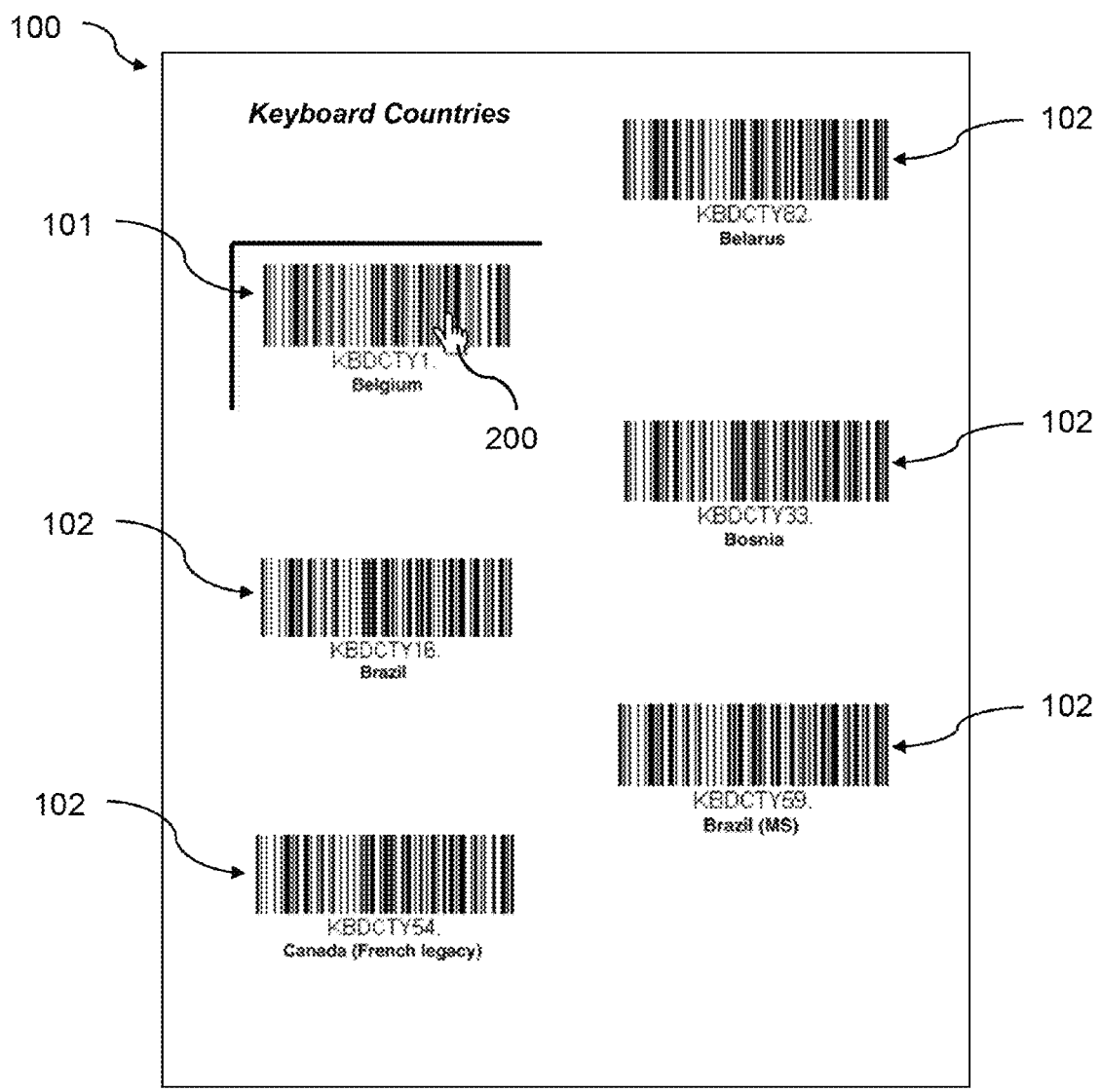
FIG. 2B depicts a user selecting a programming barcode from the exemplary list depicted in FIG. 2A and the modified view of the selected barcode symbol displayed in response to the selection.

FIG. 2B depicts the list 100 of programming commands and a pointer 200 that a user has placed over barcode symbol 101 using a mouse. The user has also clicked the mouse to select the command corresponding to barcode symbol 101. In response to the selection of the command, the system has displayed a modified view of the selected command and barcode symbol 101. As depicted, the modified view includes a shift of the selected command with respect to its original position and a shadow or border surrounding two sides. The modified view gives the user the impression that the selected command and/or barcode symbol has been pushed into the page by the clicking of the mouse.

Figure 2C:
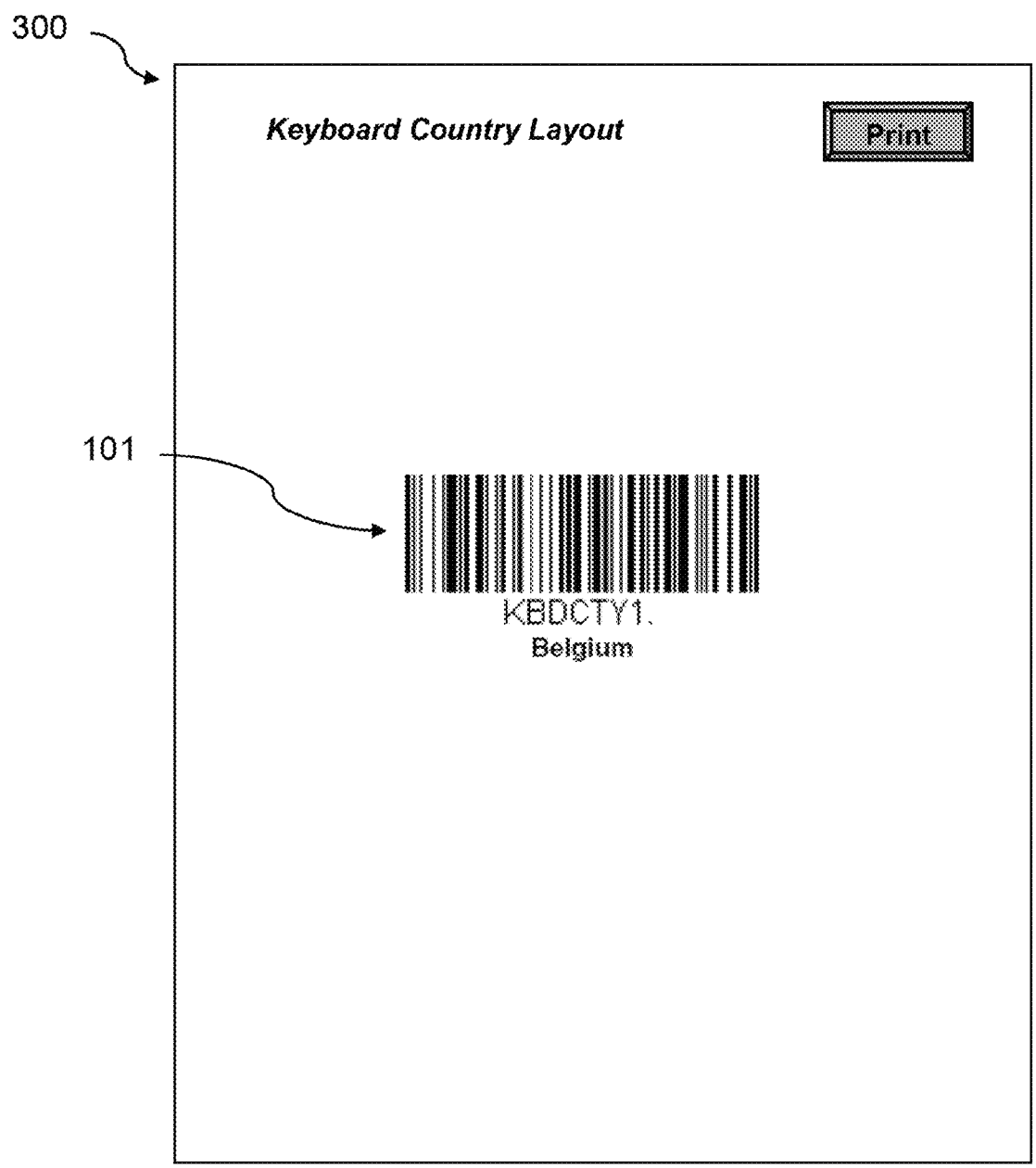
FIG. 2C depicts a page bearing the programming barcode symbol corresponding to the selected command and no other barcode symbol corresponding to another command in the list of commands depicted in FIGS. 2A and 2B.

FIG. 2C depicts a page 300 bearing a barcode symbol 101 corresponding to the selected command. As noted, the system's processor 25 displays the page 300 on display device 70 in response to the selection of a command. The page 300 bears the selected command/barcode symbol 101 and none of the other programming commands/barcode symbols 102 included in the list 100 of programming commands. In this regard, a user may place the page 300 in a barcode symbol reading system's field of view to program the system (e.g., by printing page 300).

Figure 3:
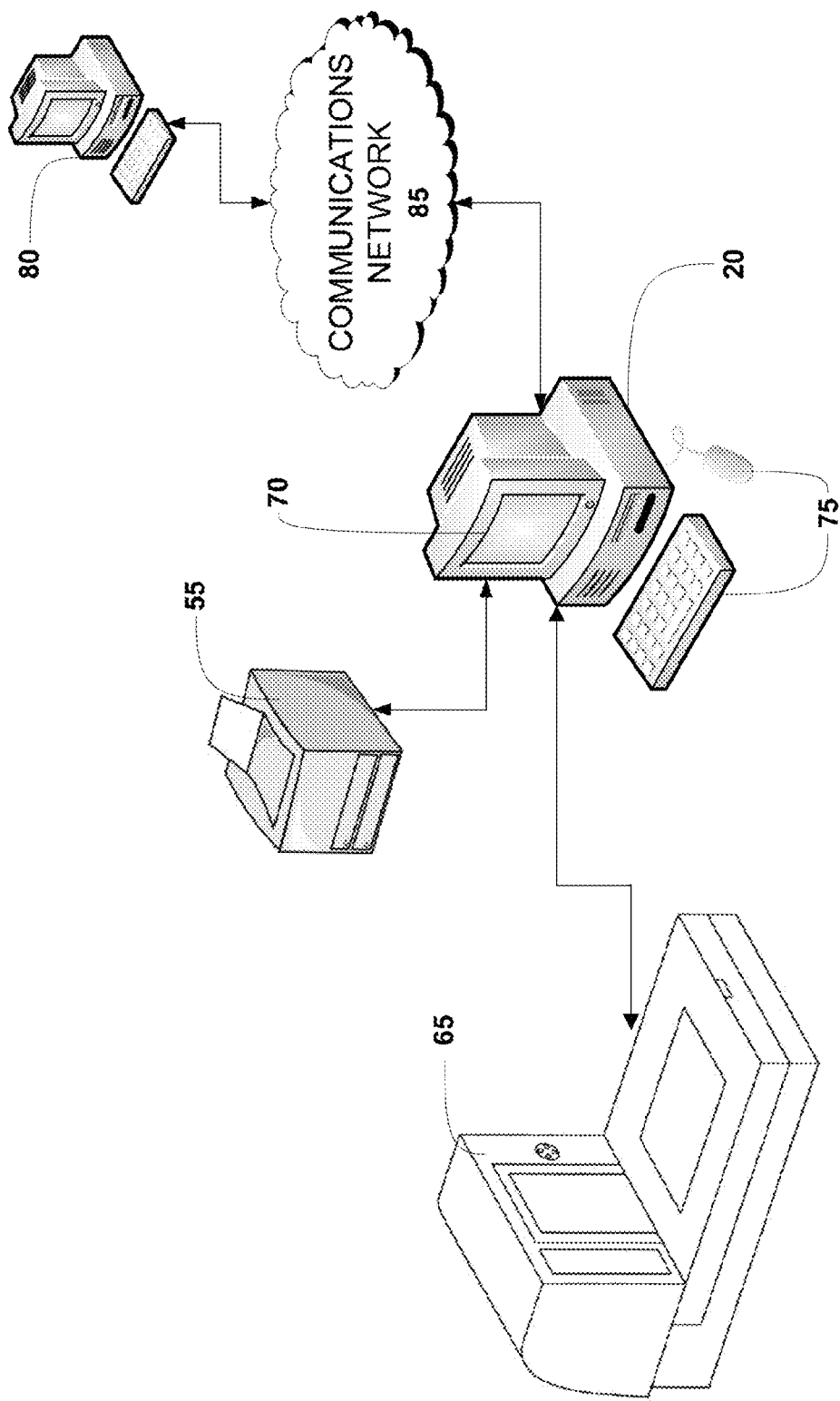
FIG. 3 depicts an exemplary computer, printer, barcode symbol reading system, and communications network in accordance with aspects of the present invention.

In another aspect, the present invention embraces a method of programming a symbol reading system having a field of view. Referring to FIGS. 1-3, the method typically includes selecting a command 101 from a list 100 of programming commands 101 and 102 for programming a symbol reading system 65. The list of programming commands is stored on a computer (e.g., on memory in the computer 20) that includes a processor 25. In response to the selection of a programming command 101 from the list 100 of programming commands, the processor 25 is configured for generating a page 300 bearing a barcode symbol 101 corresponding to the selected command and no other barcode symbol corresponding to another command in the list 100 of programming commands. The method includes placing the computer generated page 300 bearing a barcode symbol corresponding to the selected programming command within the system's field of view.

In exemplary embodiments, the method includes printing the computer generated page 300 (e.g., using printer 55) and thereafter placing the printed page bearing a barcode symbol corresponding to the selected command within the system's field of view.

The method may include selecting a second command from the list 100 of programming commands 101 and 102 and placing a computer generated page 300 bearing a barcode symbol corresponding to the second selected command within the system's field of view. In exemplary embodiments, the method includes selecting multiple programming commands from the list of programming commands and thereafter placing computer generated pages each bearing a barcode symbol corresponding to a selected command within the system's field of view. In this regard, the computer generated pages may be placed within the system's field of view in the same order in which they were selected or in a different order than that in which they were selected. Furthermore, exemplary methods may include placing a computer generated page bearing a barcode symbol corresponding to a selected command within the system's field of view multiple times.

The barcode symbol reading system may include a point of sale based system, a digital imaging subsystem, and/or a laser scanning subsystem. The computer may be a host computer communicatively connected to the barcode symbol reading system. In exemplary embodiments, the barcode symbol reading system is a bioptic, omni-directional scanning system.

In an exemplary embodiment, the barcode symbol reading system 65 is communicatively connected to a host computer 20, and the method includes accessing a list 100 of programming commands 101 and 102 displayed on a visual display 70 connected to the host computer 20. The method includes selecting a command 101 from the list 100 of programming commands 101 and 102 via a user interface 75 (e.g., a keyboard, touch-screen, and/or mouse) connected to the host computer 20. The host computer 20 includes a processor 25. In response to the selection of a command from the list 100 of programming commands 101 and 102, the processor 25 generates a page 300 bearing a barcode symbol 101 corresponding to the selected command and no other barcode symbol corresponding to another command 102 in the list 100 of programming commands. The method includes placing the computer generated page 300 bearing a barcode symbol 101 corresponding to the selected command within the system's field of view. The list of programming commands may be stored on the host computer 20 and/or on an external computer 80 (i.e., a computer other than the host computer 20) connected to the host computer 20 via a network connection (e.g., through a communications network 85). The method may also include printing the computer generated page 300 (e.g., using a printer 55) and thereafter placing the printed page bearing a barcode symbol corresponding to the selected command within the system's field of view.

In another exemplary embodiment, the barcode symbol reading system 65 is communicatively connected to a host computer 20, and the method includes accessing a list 100 including programming commands 101 and 102 for programming the barcode symbol reading system and barcode symbols corresponding to each command. The list is typically displayed on a visual display 70 connected to the host computer 20.

Exemplary methods in accordance with the present invention may be performed using exemplary systems also described in the present disclosure.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317, 105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Patent Application Publication No. 2012/ 0111946; U.S. Patent Application Publication No. 2012/ 0150589; U.S. Patent Application Publication No. 2012/ 0223141; U.S. Patent Application Publication No. 2012/ 0193423; U.S. Patent Application Publication No. 2012/ 0203647; U.S. Patent Application Publication No. 2012/ 0248188; U.S. Patent Application Publication No. 2012/ 0228382; U.S. Patent Application Publication No. 2012/ 0193407; U.S. Patent Application Publication No. 2012/ 0168511; U.S. Patent Application Publication No. 2012/ 0168512; U.S. Patent Application Publication No. 2010/ 0177749; U.S. Patent Application Publication No. 2010/

0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0177660; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); and U.S. patent application Ser. No. 13/771,508 for an Optical Redirection Adapter, filed Feb. 20, 2013 (Anderson).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of programming a barcode symbol reading system having a field of view, comprising:
　accessing a list comprising programming commands for programming the barcode symbol reading system and barcode symbols corresponding to each command, the list being displayed on a visual display connected to a computer and the list being stored as a single programming commands Portable Document Format (PDF) file on the computer;
　selecting a programming command from the list of programming commands via a user interface connected to the computer;
　wherein the computer comprises a processor configured for:
　　as a programming command is selected from the list of programming commands, displaying a modified view of the selected command comprising a shift of the selected command with respect to an original position of the selected command and a shadow surrounding the outline of the selected command; and
　　in response to the selection of a programming command from the list of programming commands, generating a page bearing a barcode symbol corresponding to the selected programming command and no other barcode symbol corresponding to another programming command in the list of programming commands, wherein the generated page is one page from a symbols PDF file stored on the computer, the symbols PDF file comprising a plurality of pages, each page bearing only one symbol corresponding to a command from the list of programming commands in the single programming commands PDF file;
　printing the computer generated page bearing a barcode symbol corresponding to the selected programming command; and
　placing the printed computer generated page within the system's field of view;
　wherein the programming commands PDF file and the symbols PDF file are hyperlinked.

2. The method of claim 1, comprising:
　selecting a second programming command from the list of programming commands; and
　placing the computer generated page bearing a barcode symbol corresponding to the second selected programming command within the system's field of view.

3. A method of programming a symbol reading system having a field of view, comprising:
　accessing a list of programming commands for programming the symbol reading system displayed on a visual display connected to computer and the list being stored as a single programming commands Portable Document Format (PDF) file on the computer;

selecting a programming command from the list of programming commands via a user interface connected to the computer;

wherein the computer comprises a processor configured for:

as a programming command is selected from the list of programming commands, displaying a modified view of the selected command comprising a shift of the selected command with respect to an original position of the selected command and a shadow surrounding the outline of the selected command; and in response to the selection of a programming command from the list of commands, generating a page bearing a symbol corresponding to the selected programming command and no other symbol corresponding to another programming command in the list of programming commands, wherein the generated page is one page from a symbols PDF file stored on the computer, the symbols PDF file comprising a plurality of pages, each page bearing only one symbol corresponding to a command from the list of programming commands in the single programming commands PDF file; and placing the computer generated page bearing a symbol corresponding to the selected programming command within the system's field of view;

wherein the programming commands PDF file and the symbols PDF file are hyperlinked.

4. The method of claim 3, comprising printing the computer generated page and thereafter placing the printed page bearing a symbol corresponding to the selected programming command within the system's field of view.

5. The method of claim 3, comprising:

selecting a second programming command from the list of programming commands; and placing the computer generated page bearing a symbol corresponding to the second selected programming command within the system's field of view.

6. A method of programming a symbol reading system having a field of view, comprising:

selecting a programming command from a list of programming commands for programming a symbol reading system, the list of programming commands being stored as a single programming commands Portable Document Format (PDF) file on a computer comprising a processor configured for:

as a programming command is selected from the list of programming commands, displaying a modified view of the selected command comprising a shift of the selected command with respect to an original position of the selected command and a shadow surrounding the outline of the selected command; and in response to the selection of a programming command from the list of programming commands, generating a page bearing a symbol corresponding to the selected programming command and no other symbol corresponding to another programming command in the list of programming commands, wherein the generated page is one page from a symbols PDF file stored on the computer, the symbols PDF file comprising a plurality of pages, each page bearing only one symbol corresponding to a command from the list of programming commands in the single programming commands PDF file; and placing the computer generated page bearing a symbol corresponding to the selected programming command within the system's field of view;

wherein the programming commands PDF file and the symbols PDF file are hyperlinked.

7. The method of claim 6, comprising printing the computer generated page and thereafter placing the printed page bearing a symbol corresponding to the selected programming command within the system's field of view.

8. The method of claim 6, comprising:

selecting a second programming command from the list of programming commands;

selecting a third programming command from the list of programming commands;

thereafter, placing a computer generated page bearing a symbol corresponding to the third selected programming command within the system's field of view; and thereafter, placing a computer generated page bearing a symbol corresponding to the second selected programming command within the system's field of view.

9. The method of claim 6, comprising placing the computer generated page bearing a symbol corresponding to the selected programming command within the system's field of view multiple times.

10. The method of claim 6, wherein the list of programming commands includes the symbol corresponding to each of the programming commands.

11. The method of claim 6, wherein the computer is connected to a user interface and the step of selecting a programming command is performed via the user interface.

12. The method of claim 6, wherein the computer is connected to a visual display and the processor is configured to display the list of programming commands on the visual display.

13. The method of claim 6, wherein the symbol reading system comprises a point of sale based system.

* * * * *